(12) United States Patent
Wilson et al.

(10) Patent No.: US 6,776,975 B2
(45) Date of Patent: *Aug. 17, 2004

(54) CRYSTALLINE ALUMINOSILICATE ZEOLITIC COMPOSITION: UZM-4M

(75) Inventors: Ben A. Wilson, Algonquin, IL (US); Gregory J. Lewis, Mt. Prospect, IL (US); Deng-Yang Jan, Elk Grove Village, IL (US); Stephen T. Wilson, Libertyville, IL (US); R. Lyle Patton, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 89 days.

This patent is subject to a terminal disclaimer.

(21) Appl. No.: 10/142,806

(22) Filed: May 9, 2002

(65) Prior Publication Data

US 2003/0211034 A1 Nov. 13, 2003

(51) Int. Cl.[7] ............................ C01B 39/06; B01J 29/06
(52) U.S. Cl. ........................ 423/713; 423/718; 502/85; 208/46
(58) Field of Search ................................ 423/713, 718; 502/85; 208/46

(56) References Cited

U.S. PATENT DOCUMENTS 2,991,151 A   4/1961  Breck et al. .................. 23/113
4,610,856 A   9/1986  Skeels et al. ................ 423/328
5,382,420 A   1/1995  Vaughan ...................... 423/716
6,419,895 B1 * 7/2002  Lewis et al.

OTHER PUBLICATIONS

John D. Sherman, Identification & Characterization of Zeolites Synthesized in the $K_2O-Al_2O_3-SiO_2-H_2O$ System, *Molecular Sieves*–II (102) 30, 1974.
S.P. Zhdanov and M.E. Ovsepyon in *Doklady Chemistry, Proc. Acad. Sci., USSR,* 156, 756 (1964).
M.E. Ovsepyan and S.P. Zhdannov, *Bull. Acad. Sci. USSR, Chem Sci.* 1, 8(1965).
R.M. Barrer et al. in J. Chem. Soc. (A) 2475 (1968).
K.J. Andries et al., in *Zeolites*, 11, 124 (1991).
K.J. Andries et al., in *Zeolites*, 11, 116 (1991).

* cited by examiner

Primary Examiner—David Sample
(74) Attorney, Agent, or Firm—John G. Tolomei; Frank S. Molinaro

(57) ABSTRACT

Applicants have synthesized a new crystalline aluminosilicate zeolite identified as UZM-4M. This new zeolite is obtained by treating a UZM-4 zeolite with a fluorosilicate salt to obtain a zeolite having the empirical formula:

$$M1_a^{n+}Al_{1-x}E_xSi_yO_z$$

where M1 is an alkali metal, alkaline earth metal, rare earth metal, hydronium ion or ammonium ion, E can be gallium, iron, boron, indium and mixtures thereof and has a Si/Al ratio of 1.5 to about 10.

42 Claims, 1 Drawing Sheet

CRYSTALLINE ALUMINOSILICATE ZEOLITIC COMPOSITION: UZM-4M

FIELD OF THE INVENTION

This invention relates to an aluminosilicate zeolite (UZM4M) derived from an as synthesized zeolite designated UZM-4. The UZM-4 composition is structurally related to zeolite Q (BPH topology), but is often thermally stable up to a temperature of 600° C. and has a higher Si/Al ratio in the range of about 1.5 to about 4.0.

BACKGROUND OF THE INVENTION

Zeolites are crystalline aluminosilicate compositions which are microporous and which are formed from corner sharing $AlO_2$ and $SiO_2$ tetrahedra. Numerous zeolites, both naturally occurring and synthetically prepared are used in various industrial processes. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure.

One particular zeolite, designated zeolite Q, was first disclosed in U.S. Pat. No. 2,991,151. The general formula for zeolite Q is represented in terms of mole ratio of the oxides by the following:

$$0.95 \pm 0.05 \ M_{2/n}O:Al_2O_3:2.2 \pm 0.05 \ SiO_2:xH_2O$$

where M designates at least one exchangeable cation, n represents the valence of M and x has a value from 0 to about 5. The examples in the patent are prepared with M being potassium. Synthesis of zeolite Q was conducted at 25° C. to 50° C. After activation at about 130° C., zeolite Q was found to adsorb small polar molecules.

In a paper by John D. Sherman entitled, "Identification and Characterization of Zeolites Synthesized in the $K_2O$—$Al_2O_3$—$SiO_2$—$H_2O$ System," *Molecular Sieves*—II(102) 30, 1974, he reports that the zeolite Q of the '151 patent is the same zeolite as zeolite K-I reported by other researchers. Zeolite K-I was first reported by S. P. Zhdanov and M. E. Ovsepyon in *Doklady Chemistry. Proc. Acad. Sci. USSR*, 156, 756 (1964). M. E. Ovsepyan and S. P. Zhdanov further reported on K-I zeolite in *Bull. Acad. Sci. USSR, Chem. Sci.* 1, 8 (1965). R. M. Barrer et al. in J. Chem. Soc. (A) 2475 (1968) showed that K-I decomposed at 168° C. It is also reported by Sherman and other researchers that zeolite Q is unstable above 130° C. and is totally disintegrated at 200° C. Owing to this thermal instability, zeolite Q has received little industrial interest. K. J. Andries et al., in *Zeolites*, 11, 124 (1991) proposed the BPH topology for zeolite Q. Synthesis of a pure form of zeolite Q was reported by K. J. Andries et al., in *Zeolites*, 11, 116 (1991). Finally, U.S. Pat. No. 5,382,420 discloses a composition designated ECR-33, which is a partially rare earth (La) exchanged zeolite Q. In all of the above reports, the Si/Al ratio is 1.

Copending application Ser. No. 09/705,653 filed Nov. 3, 2000 discloses the synthesis of a zeolite designated UZM-4, which appears to have a similar topology to that of zeolite Q, i.e., BPH, but has considerably different characteristics. The biggest difference is that UZM-4 has been synthesized with higher Si/Al ratios than zeolite Q, starting from a low of about 1.5 and going higher. The most important characteristic of UZM-4 is the greater thermal stability associated with the higher Si/Al ratios. UZM-4 in its various forms is stable to at least 400° C. and often up to greater than 600° C. The x-ray diffraction pattern of UZM-4 is noticeably different from that of zeolite-Q; and UZM-4 has smaller cell dimensions than that of zeolite Q, consistent with its higher Si/Al ratio.

Applicants have now modified the UZM-4 to give UZM-4M by treating it with a fluorosilicate salt and optionally following with a steaming, calcination, acid extraction, ion-exchange step, or a combination thereof. Skeels and Breck have disclosed in U.S. Pat. No. 4,610,856 a method for producing higher Si/Al ratio zeolites via silicon substitution for aluminum using an ammonium hexafluorosilicate post treatment. The method involves extraction of the Al from the zeolite framework, forming a defect that can be subsequently filled by Si, and producing $(NH_4)_3AlF_6$ as a soluble by-product. The process is a delicate one since it is disclosed that the extraction of Al from the framework tends to be faster than the insertion of Si into the resulting defects, thereby putting the zeolite structure at risk if the number of defects gets too high. In this regard, the composition of the initial zeolite is very important. K. J. Andries et al. in Zeolites, 11, 116 (1991), applied the techniques of Skeels and Breck to Zeolite Q, attempting to raise the Si/Al ratio from 1 in Zeolite Q to targeted values of 1.35, 1.67, and 3. However, the experimentally obtained values were 1.26, 1.32, and destruction of the framework, respectively. Their conclusion was that the zeolite Q framework is very susceptible to destruction.

Starting with UZM4, applicants have successfully used fluorosilicate treatments and optionally steaming, calcination and ion-exchange steps or combinations of these, to generate a family of stable materials with a variety of pore and catalytic properties and with Si/Al ratios that range from about 1.75 to about 500 while retaining the BPH topology, all of which are designated UZM-4M.

SUMMARY OF THE INVENTION

As stated, the present invention relates to a new aluminosilicate zeolite designated UZM-4M. Accordingly, one embodiment of the invention is a microporous crystalline zeolite having a three-dimensional framework of at least $AlO_2$ and $SiO_2$ tetrahedral units and an empirical composition on an anhydrous basis expressed by an empirical formula of:

$$M1_a^{n+}Al_{1-x}E_xSi_yO_z \qquad (I)$$

where M1 is at least one exchangeable cation selected from the group consisting of alkali metals, alkaline earth metals, rare earth metals, hydronium ion, ammonium ion and mixtures thereof, "a" is the mole ratio of M1 to (Al+E) and varies from about 0.15 to about 1.5, "n" is the weighted average valence of M1 and has a value of about 1 to about 3, E is an element selected from the group consisting of gallium, iron, boron, chromium, indium and mixtures thereof, "x" is the mole fraction of E and has a value from 0 to about 0.5, "y" is the mole ratio of Si to (Al+E) and varies from about 1.75 to about 500 and "z" is the mole ratio of O to (Al+E) and has a value determined by the equation:

$$z=(a \cdot n+3+(4 \cdot y))/2$$

and is characterized in that it has the x-ray diffraction pattern having at least the d-spacings and intensities set forth in Table A:

TABLE A

| 2θ | d(Å) | I/I₀ % |
|---|---|---|
| 6.55–6.83 | 13.49–12.93 | m |
| 7.63–7.91 | 11.58–11.17 | vs |
| 13.27–13.65 | 6.67–6.48 | m–s |
| 14.87–15.25 | 5.95–5.81 | m–vs |
| 15.35–15.74 | 5.77–5.63 | m |
| 18.89–19.31 | 4.69–4.59 | m |
| 20.17–20.50 | 4.40–4.33 | w–m |
| 20.43–20.85 | 4.34–4.26 | m |
| 21.51–21.97 | 4.13–4.04 | m–vs |
| 24.14–24.67 | 3.68–3.60 | m–s |
| 24.47–24.98 | 3.63–3.56 | m–s |
| 27.73–28.27 | 3.21–3.15 | w–m |
| 30.11–30.73 | 2.97–2.90 | m–s |
| 31.13–31.75 | 2.87–2.81 | w–m |

Another embodiment of the invention is a process for preparing the crystalline microporous zeolite described above. The process comprises treating a starting microporous crystalline zeolite with a fluorosilicate solution or slurry at a pH of about 3 to about 7, whereby framework aluminum atoms of the starting zeolite are removed and replaced by extraneous silicon atoms to give the modified zeolite; the starting zeolite having an empirical formula on an anhydrous basis of:

$$M'_{m'}{}^{n+}R_{r'}{}^{p+}Al_{1-x}E_xSi_yO_z \quad (III)$$

where "m'" is the mole ratio of M to (Al+E) and varies from 0 to about 1.5, M' is at least one exchangeable cation selected from the group consisting of alkali metals, alkaline earth metals, rare earth metals, hydrogen ion, ammonium ion and mixtures thereof, R is at least one organic cation selected from the group consisting of protonated amines, quaternary ammonium ions, diquaternary ammonium ions, protonated alkanolamines and quaternized alkanolammonium ions, "r'" is the mole ratio of R to (Al+E) and has a value of 0 to about 1.5, "p" is the weighted average valence of R and has a value of about 1 to about 2, "y" is the ratio of Si to (Al+E) and varies from about 1.5 to about 4.0, E is an element selected from the group consisting of gallium, iron, chromium, indium, boron and mixtures thereof, "x" is the mole fraction of E and has a value from 0 to about 0.5 and "z" is the mole ratio of O to (Al+E) and is given by the equation:

$$z=(m'·n+r·p+3+4·y)/2.$$

Yet another embodiment of the invention is the use of UZM-4M in a hydrocarbon process such as aromatic alkylation.

These and other objects and embodiments will become more apparent after a detailed description of the invention.

BRIEF DESCRIPTION OF THE FIGURE

The FIGURE presents x-ray diffraction patterns for the compositions from examples 24, 42, 9, 21 and 31 labeled a to e respectively.

DETAILED DESCRIPTION OF THE INVENTION

Figure 1:
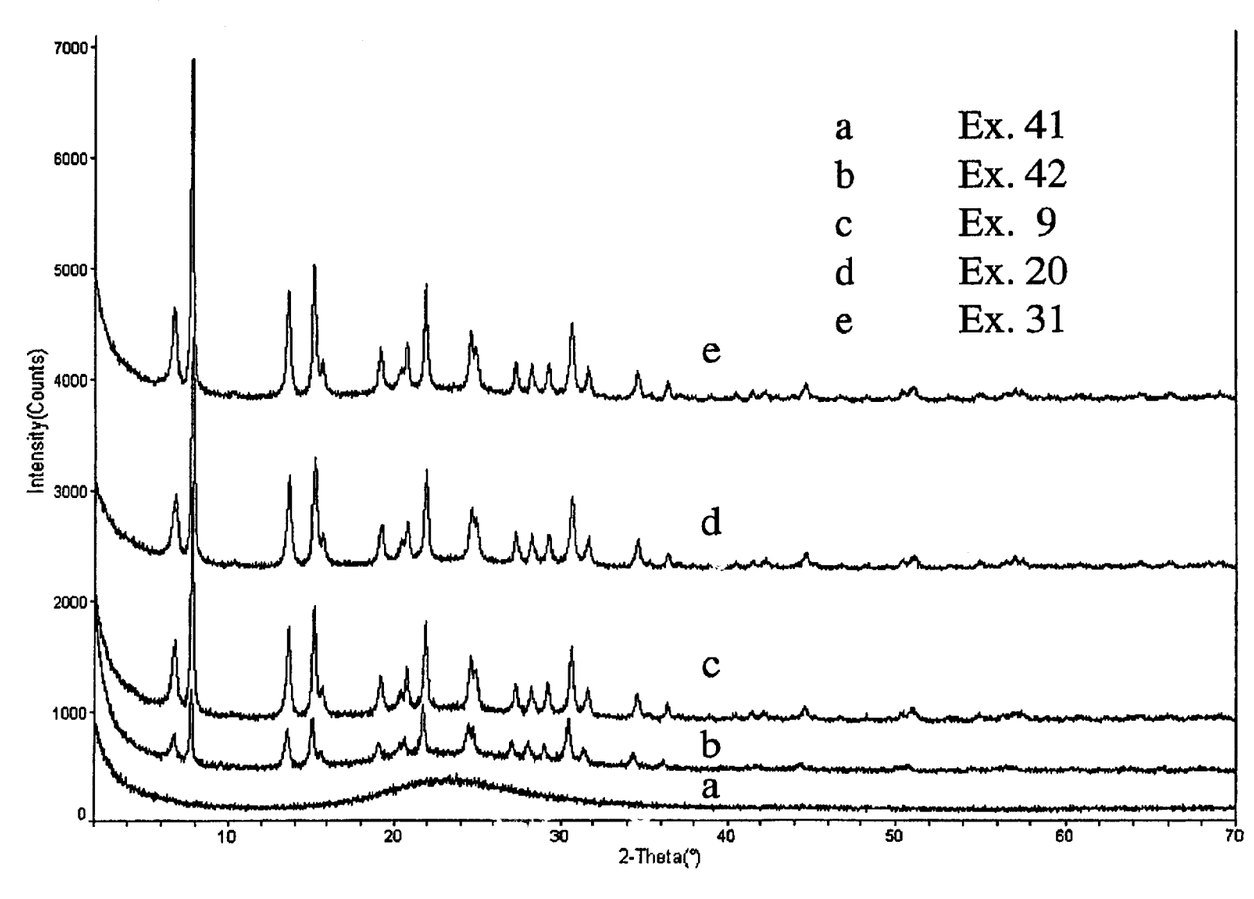

The aluminosilicate zeolite (UZM-4M) and substituted versions of the same of the invention have the topological structure of BPH as described in *Atlas of Zeolite Structure Types*, W. H. Meier, D. H. Olson, and C. H. Baerlocher, editors, Elsevier, (1996), 68–69. UZM-4M is obtained by treating a starting zeolite having the topology of UZM-4 with a fluorosilicate salt and optionally one or more of steaming, calcining, acid extraction and ion-exchange procedures. UZM-4 is described in U.S. application Ser. No. 09/705,653 filed Nov. 3, 2000 the contents of which are incorporated in its entirety by reference. As described in the '653 application, UZM-4 has a composition in the as-synthesized form and on an anhydrous basis expressed by the empirical formula:

$$M_m{}^{n+}R_r{}^{p+}Al_{1-x}E_xSi_yO_z \quad (II)$$

where M is at least one exchangeable cation and is selected from the group consisting of alkali and alkaline earth metals and "m" is the mole ratio of M to (Al+E) and varies from about 0.05 to about 0.95. Specific examples of the M cations include but are not limited to lithium, sodium, potassium, rubidium, cesium, calcium, strontium, barium, and mixtures thereof. R is an organic cation and is selected from the group consisting of protonated amines, protonated diamines, quaternary ammonium ions, diquaternary ammonium ions, protonated alkanolamines and quaternized alkanolammonium ions. The value of "r" which is the mole ratio of R to (Al+E) varies from about 0.05 to about 0.95. The value of "n" which is the weighted average valence of M varies from about 1 to about 2. The value of "p" which is the weighted average valence of R varies from 1 to about 2. The ratio of Si to (Al+E) is represented by "y" which varies from about 1.5 to about 4.0. E is an element which is tetrahedrally coordinated, is present in the framework and is selected from the group consisting of gallium, iron, chromium, indium, boron and mixtures thereof. The mole fraction of E is represented by "x" and has a value from 0 to about 0.5, while "z" is the mole ratio of O to (Al+E) and is given by the equation:

$$z=(m·n+r·p+3+4·y)/2$$

where M is only one metal, then the weighted average valence is the valence of that one metal, i.e. +1 or +2. However, when more than one M metal is present, the total amount of:

$$M_m^{n+} = M_{m1}^{(n1)+} + M_{m2}^{(n2)+} + M_{m3}^{(n3)+} + ...$$

and the weighted average valence "n" is given by the equation:

$$n = \frac{m_1 \cdot n_1 + m_2 \cdot n_2 + m_3 \cdot n_3 + ...}{m_1 + m_2 + m_3 ...}$$

Similarly when only one R organic cation is present, the weighted average valence is the valence of the single R cation, i.e., +1 or +2. When more than one R cation is present, the total amount of R is given by the equation.

$$R_r^{p+} = R_{r1}^{(p1)+} + R_{r2}^{(p2)+} + R_{r3}^{(p3)+}$$

and the weighted average valence "p" is given by the equation $$p = \frac{p_1 \cdot r_1 + p_2 \cdot r_2 + p_3 \cdot r_3 + ...}{r_1 + r_2 + r_3 + ...}$$

The microporous crystalline zeolite, UZM-4, is prepared by a hydrothermal crystallization of a reaction mixture prepared by combining reactive sources of M, R, aluminum, silicon and optionally E. The sources of aluminum include but are not limited to aluminum alkoxides, precipitated aluminas, aluminum metal, aluminum salts and alumina sols. Specific examples of aluminum alkoxides include, but are not limited to aluminum ortho sec-butoxide and aluminum ortho isopropoxide. Sources of silica include but are not limited to tetraethylorthosilicate, colloidal silica, precipitated silica and alkali silicates. Sources of the E elements include but are not limited to alkali borates, boric acid, precipitated gallium oxyhydroxide, gallium sulfate, ferric sulfate, ferric chloride, chromium nitrate and indium chloride. Sources of the M metals include the halide salts, nitrate salts, acetate salts, and hydroxides of the respective alkali or alkaline earth metals. When R is a quaternary ammonium cation or a quaternized alkanolammonium cation, the sources include the hydroxide, chloride, bromide, iodide and fluoride compounds. Specific examples include without limitation tetramethylammonium hydroxide, tetraethylammonium hydroxide, hexamethonium bromide, diethyldimethylammonium hydroxide, tetrapropylammonium hydroxide, tetramethylammonium chloride and choline chloride. R may also be introduced as an amine, diamine, or alkanolamine. Specific examples are N,N,N',N'-tetramethyl-1,6-hexanediamine, triethylamine, and triethanolamine.

The reaction mixture containing reactive sources of the desired components can be described in terms of molar ratios of the oxides by the formula:

$$aM_{2/n}O:bR_{2/p}O:1-cAl_2O_3:cE_2O_3:dSiO_2:eH_2O$$

where "a" varies from about 0.05 to about 1.5, "b" varies from about 1.0 to about 15, "c" varies from about 0 to 0.5, "d" varies from about 2.5 to about 15, and "e" varies from about 25 to about 2500. If alkoxides are used, it is preferred to include a distillation or evaporative step to remove the alcohol hydrolysis products. The reaction mixture is now reacted at a temperature of about 85° C. to about 225° C. and preferably from about 125° C. to about 150° C. for a period of about 1 day to about 2 weeks and preferably for a time of about 2 days to about 4 days in a sealed reaction vessel under autogenous pressure. After crystallization is complete, the solid product is isolated from the heterogeneous mixture by means such as filtration or centrifugation, and then washed with deionized water and dried in air at ambient temperature up to about 100° C.

The UZM-4 aluminosilicate zeolite, which is obtained from the above-described process, is characterized by the x-ray diffraction pattern, having at least the d-spacings and relative intensities set forth in Table B below.

TABLE B

| 2-θ | d(Å) | I/I₀ % |
|---|---|---|
| 6.45–6.75 | 13.69–13.08 | m |
| 7.52–7.80 | 11.75–11.33 | vs |
| 14.75–15.06 | 6.00–5.88 | w–m |
| 15.30–15.66 | 5.79–5.65 | w |
| 18.70–19.05 | 4.74–4.66 | w–m |
| 20.23–20.51 | 4.39–4.33 | w–m |
| 21.30–21.61 | 4.17–4.11 | m |
| 24.00–24.34 | 3.70–3.65 | m |
| 26.56–26.96 | 3.35–3.30 | w–m |
| 27.47–27.80 | 3.24–3.21 | w–m |
| 28.56–28.88 | 3.12–3.09 | w |
| 29.95–30.31 | 2.98–2.95 | m |
| 30.84–31.19 | 2.90–2.87 | w |
| 33.70–34.17 | 2.66–2.62 | w |
| 35.45–35.92 | 2.53–2.50 | w |
| 43.46–44.00 | 2.08–2.06 | w |

The UZM-4 zeolite is thermally stable up to a temperature of at least 400° C. and preferably up to about 600° C. The UZM-4 zeolite has also been found to have a smaller unit cell size than zeolite Q, indicative of a higher Si/Al ratio. That is, a representative UZM-4 has a hexagonal unit cell of a=13.269 Å, c=13.209 Å, versus a unit cell for zeolite Q of a=13.501 Å and c=13.403 Å.

The cation population of the starting UZM-4 zeolite is not a critical factor of the instant process insofar as substitution of silicon for framework aluminum is concerned. Thus, the UZM-4 can be used as synthesized or can be ion exchanged to provide a different cation form. In this respect, the starting zeolite can be described by the empirical formula:

$$M'^{n+}_{m'}R_{r}^{p+}Al_{1-x}E_xSi_yO_z \quad (III)$$

where R, "n", "p", "x", "y", "z" and E are as described above and "m'" has a value from 0 to about 1.5, "r" has a value from 0 to about 1.5 and M' is a cation selected from the group consisting of alkali metals, alkaline earth metals, rare earth metals, hydrogen ion, ammonium ion and mixtures thereof. The designation UZM-4 will be used to refer to the zeolite represented by formula (III) which is seen to include the composition of both the as-synthesized and ion exchanged forms of the zeolite.

Of the cation forms which can be used, preferred cations are at least one of lithium, potassium, ammonium and hydrogen cations, with ammonium and hydogen cations being especially preferred. These cations are preferred because they form soluble salts during the modification process (see below) which can easily be removed from the zeolite pores. An all ammonium form of UZM-4 is most preferred.

Methods used to exchange one cation for another are well known in the art and involve contacting the microporous compositions with a solution containing the desired cation (at molar excess) at exchange conditions. Exchange conditions include a temperature of about 15° C. to about 100° C. and a time of about 20 minutes to about 50 hours. Although not preferred, the organic cation can first be removed by heating under controlled conditions.

In the preferred case the UZM-4 is converted to the ammonium form by contacting it with ammonium nitrate at a temperature of about 15° C. to about 100° C., followed by a water wash. This procedure may be repeated several times to obtain as complete as possible exchange of the original cations with ammonium cations. Finally, the ammonium exchanged UZM-4 zeolite is dried at 110° C.

The UZM-4M of the present invention is prepared by treating the UZM-4 composition described above with a fluorosilicate salt at a temperature of about 20° C. to about 90° C. The fluorosilicate salt serves two purposes. It removes aluminum atoms from the framework and provides a source of extraneous silicon which can be inserted into the framework (replacing the aluminum). The fluorosilicate salts which can be used are those described by the general formula:

$$A_{2/n}SiF_6$$

where "n" is the valence of A and A is a cation selected from the group consisting of NH₄⁺, H⁺, Mg⁺², Li⁺, Na⁺, K⁺, Ba⁺²Cd⁺², Cu⁺, Cu⁺², Ca⁺², Cs⁺, Fe⁺², Ca⁺², Pb⁺², Mn⁺², Rb⁺, Ag⁺, Sr⁺², Tl⁺, and Zn⁺². The ammonium fluorosilicate is most preferred because of its substantial solubility in water and because it forms water soluble by-product salts upon reaction with the zeolite, namely (NH₄)₃AlF₆.

The fluorosilicate salt is contacted with the UZM-4 zeolite in the form of an aqueous solution or slurry at a pH in the range of about 3 to about 7. This solution is contacted with the zeolite either incrementally or continuously at a slow rate such that a sufficient proportion of the framework aluminum atoms removed are replaced by silicon atoms to retain at least 50%, preferably at least 90% of the framework (crystalline) structure of the starting UZM-4 zeolite. The amount of fluorosilicate necessary to carry out the process of this invention can vary considerably, but should be at least in an amount of 0.0075 moles of fluorosilicate salt per 100 grams of starting zeolite. Once the reaction is complete, the product zeolite UZM-4M is isolated by conventional techniques such as filtration.

Without wishing to be bound by any one particular theory, the process of removing aluminum and inserting the silicon appears to proceed in two steps in which the aluminum extraction step will, unless controlled, proceed very rapidly while the silicon insertion is relatively slow. If dealumination becomes too extensive without silicon substitution, the crystal structure becomes seriously degraded and ultimately collapses. In general, the rate of aluminum extraction is decreased as the pH of the fluorosilicate solution in contact with the zeolite is increased within the range of about 3 to about 7 and as the concentration of the fluorosilicate in the reaction system is decreased. At pH values below about 3, crystal degradation is generally found to be unduly severe, whereas at pH values higher than 7, silicon insertion is unduly slow. Also, increasing the reaction temperature tends to increase the rate of substitution of silicon. Increasing the reaction temperature has been found to have less of an effect on dealumination than the pH of the solution. Therefore, the pH may be considered a means of controlling dealumination while temperature may be considered as a means of controlling the substitution rate.

Theoretically, there is no lower limit for the concentration of fluorosilicate salt in the aqueous solution employed, provided, of course, the pH of the solution is high enough to avoid undue destructive acidic attack on the UZM-4 zeolite structure apart from the intended reaction with the fluorosilicate. A slow rate of addition of fluorosilicate salts insures that adequate time is permitted for the insertion of silicon into the framework before excessive aluminum extraction occurs with consequent collapse of the crystal structure. In general the effective reaction temperature is within the range between about 10° C. and about 99° C., preferably between about 20° C. and 95° C., but temperatures of 125° C. or higher and as low as 0° C. can be used.

The maximum concentration of fluorosilicate salt in the aqueous solution employed is, of course, interrelated to the temperature and pH factors and also with the time of contact between the zeolite and the solution and the relative proportions of zeolite and fluorosilicate salt. Solutions having fluorosilicate salt concentrations of between $10^{-3}$ moles per liter of solution and up to saturation of the solution can be employed, but it is preferred that concentrations in the range of between about 0.05 and about 2.0 moles per liter of solution be used. In addition, as hereinbefore discussed, slurries of the fluorosilicate salts may be employed. The aforementioned concentration values are with respect to true solutions, and are not intended to apply to the total fluorosilicate salts in slurries of the salts in water. Even very slightly soluble fluorosilicate salts can be slurried in water and used as a reagent, the undissolved solids being readily available to replace dissolved molecular species consumed in reaction with the zeolite. The minimum value for the amount of fluoro salt to be added is preferably at least equivalent to the minimum mole fraction of aluminum to be removed from the zeolite.

It has been found that when large amounts of silicon atoms are to be substituted, i.e., increasing the $SiO_2/Al_2O_3$ ratio by more than about 100%, it is preferable to carry out the process in multiple steps in order to minimize crystal degradation. As the amount of silicon which is substituted into the framework is substantially increased (beyond 100% increase) it may actually be necessary to carry out the process in two or more steps in order to prevent excessive degradation of the crystalline structure. That is, contacting with the fluorosilicate salt is carried out in two or more steps using a lower concentration of the fluorosilicate salt than that required to replace the desired amount of silicon in one step. After each fluorosilicate treatment, the product is washed to remove fluoride and aluminum. Drying of the zeolite at 50° C. between the treatments may also be done to facilitate the handling of the wet zeolite product.

The UZM-4M as prepared above (or as exchanged below) is described by the empirical formula on an anhydrous basis of:

$$M1_a^{n+}Al_{1-x}E_xSi_yO_z$$

where M1 is at least one exchangeable cation selected from the group consisting of alkali metals, alkaline earth metals, rare earth metals, hydrogen ion, ammonium ion and mixtures thereof, "a" is the mole ratio of M1 to (Al+E) and varies from about 0.15 to 1.5, "n" is the weighted average valence of M1 and has a value of about 1 to about 3, E is an element selected from the group consisting of gallium, iron, boron, chromium, indium and mixtures thereof, "x" is the mole fraction of E and has a value from 0 to about 0.5, "y" is the mole ratio of Si to (Al+E) and varies from about 1.75 to about 500 and "z" is the mole ratio of O to (Al+E) and has a value determined by the equation:

$$z=(a \cdot n + r \cdot p + 3 + 4 \cdot y)/2.$$

In specifying the proportions of the zeolite starting material or adsorption properties of the zeolite product and the like herein, the "anhydrous state" of the zeolite will be intended unless otherwise stated. The term "anhydrous state" is employed herein to refer to a material substantially devoid of both physically adsorbed and chemically adsorbed water.

It is apparent from the foregoing that, with respect to effective process conditions, it is desirable that the integrity of the zeolite crystal structure be substantially maintained throughout the process, and that, in addition to having silicon atoms inserted into the lattice, the zeolite retains at least 50 percent, preferably at least 70 and more preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak intensities, in terms of arbitrary units above background, of the starting material is used as the standard and is compared with the corresponding peak intensities of the products. When, for example, the numerical sum of the peak intensities of the molecular sieve product is 85 percent of the value of the sum of the peak heights of the starting zeolite, then 85 percent of the crystallinity has been retained. In practice it is common to utilize only a portion of the peaks for this purpose, as for example, five or six of the strongest peaks. Other indications of the retention of crystallinity are surface area and adsorption capacity. These tests may be preferred when the substituted metal significantly changes, e.g., increases, the absorption of x-rays by the sample.

After having undergone the AFS treatment as described above, the UZM-4M is usually dried and can be used in various processes as discussed below. Applicants have found that the properties of the UZM-4M can be further modified by one or more additional treatment. These treatments include steaming, calcining or ion exchanging and can be carried out individually or in any combination. Some of these combinations include but are not limited to:

steam→calcine→ion exchange;

calcine→steam→ion exchange;

ion exchange→steam→calcine;

ion exchange→calcine→steam;

steam→calcine;

calcine→steam etc.

Steaming is carried out by contacting the UZM-4M with steam at a concentration of about 1 wt. % to about 100 wt. %, a temperature of about 400° C. to about 850° C. for a time of about 10 minutes to about 4 hrs.; preferably at a steam concentration of 5–50 wt. % at 500° C.–600° C. for 1–2 hours.

Calcination conditions comprise a temperature of about 400° C. to about 600° C. for a time of about 0.5 hr. to about 24 hrs. The ion exchange conditions are the same as set forth above, namely a temperature of about 15° C. to about 100° C. and a time of about 20 minutes to about 50 hours. Ion exchange can be carried out with a solution comprising a cation (M1') selected from the group consisting of alkali metals, alkaline earth metals, rare earth metals, hydrogen ion, ammonium ion and mixtures thereof. By carrying out this ion exchange, the M1 cation is exchanged for a secondary and usually different M1' cation. In a preferred embodiment, the UZM-4M composition after the steaming and/or calcining steps (in any order) is contacted with an ion exchange solution an comprising an ammonium salt. Examples of ammonium salts include but are not limited to ammonium nitrate, ammonium chloride, ammonium bromide and ammonium acetate. The ammonium ion containing solution can optionally contain a mineral acid such as but not limited to nitric, hydrochloric, sulfuric and mixtures thereof. The concentration of mineral acid can vary to give a ratio of $H^+$ to $NH_4^+$ of 0 to 1. This ammonium ion exchange aids in removing any debris present in the pores after the steaming and/or calcination treatments.

It should be pointed out that the particular sequence of treatments, e.g. AFS, steaming, calcining, etc. can be repeated as many times as necessary to obtain the desired properties. Of course only one treatment can be repeated while not repeating other treatments, e.g. repeating the AFS treatment two or more times before carrying out steaming or calcining, etc. Finally, the sequence and/or repetition of treatments will determine the properties of the final UZM-4M composition.

The UZM-4M zeolite obtained after one or more of the above described treatments will have x-ray diffraction patterns which are different (and thus unique) from that of UZM-4. A characteristic of the diffraction patterns of the UZM-4M materials is that the unit cell is hexagonal with a and b ranging from 13.40 Å-12.93 Å and c ranging from 13.30 Å to 12.93 Å. A list of major peaks that are common to all the UZM-4M materials is given in Table A.

TABLE A

| 2θ | d(Å) | I/I$_0$ % |
|---|---|---|
| 6.55–6.83 | 13.49–12.93 | m |
| 7.63–7.91 | 11.58–11.17 | vs |
| 13.27–13.65 | 6.67–6.48 | m–s |
| 14.87–15.25 | 5.95–5.81 | m–vs |
| 15.35–15.74 | 5.77–5.63 | m |
| 18.89–19.31 | 4.69–4.59 | m |
| 20.17–20.50 | 4.40–4.33 | w–m |
| 20.43–20.85 | 4.34–4.26 | m |
| 21.51–21.97 | 4.13–4.04 | m–vs |
| 24.14–24.67 | 3.68–3.60 | m–s |
| 24.47–24.98 | 3.63–3.56 | m–s |
| 27.73–28.27 | 3.21–3.15 | w–m |
| 30.11–30.73 | 2.97–2.90 | m–s |
| 31.13–31.75 | 2.87–2.81 | w–m |

The crystalline UZM-4M zeolite of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The UZM-4M zeolite of this invention can also be used as a catalyst or catalyst support in various hydrocarbon conversion processes. Hydrocarbon conversion processes are well known in the art and include cracking, hydrocracking, alkylation of both aromatics and isoparaffin, isomerization of paraffins and aromatics, e.g. xylenes, hydro-isomerization of paraffins, polymerization, reforming, hydrogenation, dehydrogenation, transalkylation of aromatics, disproportionation of aromatics, dealkylation, hydration, dehydration, hydrotreating, hydrodenitrogenation, hydrodesulfurization, methanation and syngas shift process. Specific reaction conditions and the types of feeds which can be used in these processes are well known in the art and are summarized here for completeness. Preferred hydrocarbon conversion processes are hydrocracking and hydroisomerization, isomerization of aromatics, disproportionation/transalkylation of aromatics, and alkylation of aromatics.

Hydrocracking conditions typically include a temperature in the range of 400° to 1200° F. (204–649° C.), preferably between 600° and 950° F. (316–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 hr$^{-1}$ to 15 hr$^{-1}$, preferably between about 0.2 and 3 hr$^{-1}$. Hydrogen circulation rates are in the range of 1,000 to 50,000 standard cubic feet (scf) per barrel of charge (178–8,888 std. m$^3$/m$^3$), preferably between 2,000 and 30,000 scf per barrel of charge (355–5,333 std. m$^3$/m$^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the UZM-4M composition using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

Alkylation of aromatics usually involves reacting an aromatic compound, especially benzene, with a monoolefin or alcohol ($C_2$ to $C_{12}$) to produce a linear alkyl substituted aromatic. The process is carried out at an aromatic:olefin (e.g., benzene:olefin) ratio of between 1:1 and 30:1, a LHSV of about 0.3 to about 6 $hr^{-1}$, a temperature of about 100° to about 450° C. and pressures of about 200 to about 1000 psig. Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 to about 120. Details on paraffin alkylation may be found in U.S. Pat. Nos. 5,157,196 and 5,157,197, which are incorporated by reference.

The x-ray patterns presented in the following examples and of Tables A and B were obtained using standard x-ray powder diffraction techniques. The radiation source was a high-intensity, x-ray tube operated at 45 kV and 35 ma. The diffraction pattern from the copper K-alpha radiation was obtained by appropriate computer based techniques. Flat compressed powder samples were continuously scanned at 2° to 70° (2θ). Interplanar spacings (d) in Angstrom units were obtained from the position of the diffraction peaks expressed as θ, where θ is the Bragg angle, as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100%× $I/I_o$, the above designations are defined as:

w=0–15; m=15–60:s=60–80 and vs=80–100

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims. In the examples that follow, the value of the Si/Al ratio in the modified product is shown in parenthesis. Thus, UZM-4M (2.7) represents a UZM-4M composition with a Si/Al=2.7.

EXAMPLES

Example 1

Synthesis of UZM-4

In a beaker 1305.6 grams of aqueous 35 wt. % tetraethylammonium hydroxide (TEAOH) were combined with 75.6 grams of aluminum hydroxide and stirred until dissolved. To this solution were added 331.2 grams deionized (DI) water followed by the slow addition of 287.6 grams of Ludox™ AS-40. The resultant reaction mixture was stirred for 2 hours at room temperature, added to 1 liter Teflon bottles which were placed in a 95° C. oven for 24 hours and then cooled to room temperature to yield an aluminosilicate reaction mixture.

In a small beaker 13.3 grams of lithium chloride solid and 68.0 grams of tetramethylammonium chloride solid (TMACl) were combined and sufficient DI water was added to form a homogeneous solution. This aqueous solution was then slowly dripped into 1600 grams of the aluminosilicate reaction mixture with vigorous mixing. Upon completing the addition, the resultant mixture was homogenized for an additional 2 hours at room temperature. In a 2 liter stainless steel reactor, 1400 grams of this reaction mixture was digested quiescently for 72 hours at 125° C. and then cooled to room temperature. The product was isolated by centrifugation. The isolated product was washed three (3) times with de-ionized water and then dried at 95° C. for 16 hours. The X-ray diffraction data showed it to be pure UZM-4.

Example 2

Exchange of UZM-4

In a glass beaker an $NH_4NO_3$ exchange solution was prepared by combining $NH_3NO_3$ and de-ionized water in the ratios 1.0 gram of $NH_4NO_3$ per 5.7 grams of de-ionized water. The UZM-4 of Example 1 was added to this solution at the ratio of 1 gram UZM-4 per gram of ammonium nitrate employed in the solution. The slurry was heated to 80° C. for 1 hour, then filtered and washed with warm (50° C.) de-ionized water. This exchange procedure was repeated two more times. After the third exchange the UZM-4 product was washed with de-ionized water, dried at 50° C. for 16 hours and re-hydrated at ambient conditions for 24 hours. The chemical analysis showed that the lithium content went from 5.40 wt. % ($Li_2O$ wt. % volatile free) to 0.19 wt. %. The amount of carbon also decreased from 8.90 wt. % to 0.39 wt. % indicating removal of the organic template.

Example 3

AFS Treatment of UZM-4

In a beaker 6.0 grams (ignited basis) of $NH_4$ UZM-4 from example 2 was slurried in 37.8 grams of 3.4M ammonium acetate. To this slurry, which was stirred and heated to 85° C., a solution of containing 1.6 grams of $(NH_4)_2SiF_6$ (AFS) dissolved in 31.2 grams of de-ionized water was added. After completing AFS solution addition, the slurry was stirred at 85° C. for an additional hour, filtered while hot and the product was washed with warm (50° C.) de-ionized water. The product was then re-slurried in warm (50° C.) de-ionized water and filtered. This process was repeated two more times. The filtered product was dried at 85° C. for 16 hours, then hydrated under ambient conditions and is designated UZM-4M (2.7). A comparison of the x-ray diffraction powder pattern of the starting material (UZM-4) and the UZM-4M (2.7) product is shown in Table 1. The observed data is consistent with retention of crystallinity and indicates a shrinkage in unit cell consistent with substitution of Si for Al (Table 2).

TABLE 1

X-ray diffraction comparison of UZM-4 vs. UZM-4M (2.7)

| UZM-4 (Ex. 2) | | | UZM-4M (2.7) | | |
|---|---|---|---|---|---|
| 2-θ | d(Å) | I/I % | 2-θ | d(Å) | I/I % |
| 6.70 | 13.18 | m | 6.64 | 13.31 | m |
| 7.68 | 11.50 | vs | 7.68 | 11.50 | vs |
| 13.36 | 6.62 | m | 13.32 | 6.64 | m |
| 14.90 | 5.94 | m | 14.92 | 5.93 | m |
| 15.44 | 5.73 | m | 15.40 | 5.75 | m |
| 18.90 | 4.69 | w-m | 18.94 | 4.68 | m |
| | | | 20.08 | 4.42 | m |
| 20.34 | 4.36 | m | 20.48 | 4.33 | m |
| 21.44 | 4.14 | m | 21.56 | 4.12 | m |
| 24.44 | 3.64 | m | 24.20 | 3.67 | m |
| | | | 24.52 | 3.63 | m |
| 26.80 | 3.32 | m | 26.92 | 3.31 | m |
| 27.62 | 3.23 | m | 27.78 | 3.21 | m |
| 28.78 | 3.10 | m | 28.06 | 3.18 | m |
| | | | 28.84 | 3.09 | m |
| 30.06 | 2.97 | m | 30.16 | 2.96 | s |
| 31.02 | 2.88 | m | 31.18 | 2.87 | m |
| 33.84 | 2.65 | m | 34.06 | 2.63 | m |
| 35.66 | 2.516 | w | 35.88 | 2.501 | w |
| 39.70 | 2.269 | w | 39.94 | 2.255 | w |
| | | | 40.90 | 2.205 | w |
| 41.26 | 2.186 | w | 41.52 | 2.173 | w |
| 43.64 | 2.072 | w-m | 44.00 | 2.056 | w |
| | | | 44.50 | 2.034 | w |
| 49.46 | 1.841 | w | 49.76 | 1.831 | w |
| 49.98 | 1.823 | w-m | 50.32 | 1.812 | w |
| | | | 52.32 | 1.747 | w |
| 53.88 | 1.700 | w | 54.10 | 1.694 | w |
| 55.70 | 1.649 | w-m | 56.18 | 1.636 | m |

A comparison of the chemical and physical properties of the starting UZM-4 zeolite (Example 2) and the product UZM-4M (2.7) is shown in Table 2 and is consistent with framework incorporation of Si for Al.

TABLE 2

Comparison of Properties for UZM-4 vs. UZM-4M (2.7)

| Properties | UZM-4 (Ex. 2) | UZM-4M (2.7) |
|---|---|---|
| C (wt. % anhydrous) | 0.39 | 0.39 |
| N (wt. % anhydrous) | 7.47 | 5.65 |
| $Na_2O$ (wt. % volatile free) | 0.50 | 0.47 |
| $Li_2O$ (wt. % volatile free) | 0.19 | 0.11 |
| $Al_2O_3$ (wt. % volatile free) | 32.31 | 24.00 |
| $SiO_2$ (wt. % volatile free) | 67.17 | 75.73 |
| F (wt. % anhydrous) | ND | 0.10 |
| Si/Al | 1.77 | 2.83 |
| $Na^+$/Al | 0.025 | 0.032 |
| $Li^+$/Al | 0.020 | 0.015 |
| N/Al | 0.913 | 0.913 |
| Cation Equivalent, $M^+$/Al $M^+ = (Na^+ + Li + N)$ | 0.958 | 0.960 |
| Unit cell size (In Angstroms) | | |
| $a_0 =$ | 13.34 | 13.21 |
| $c_0 =$ | 13.26 | 13.26 |
| Framework Infrared | | |
| Asymmetric Stretch, $cm^{-1}$ | 1002 | 1021 |
| Surface Area | | |
| Micro pore Volume (cc/g) | 0.033 | 0.254 |
| Total pore Volume (cc/g) | 0.397 | 0.716 |
| BET surface area ($m^2$/g) | 117 | 557 |

TABLE 2-continued

Comparison of Properties for UZM-4 vs. UZM-4M (2.7)

| Properties | UZM-4 (Ex. 2) | UZM-4M (2.7) |
|---|---|---|
| $^{27}$Al NMR | | |
| Mole % Al | | |
| Framework | 98.5 | 98.8 |
| Non-framework | 1.5 | 1.2 |

ND = Not determined

Example 4

Preparation of UZM-4M (3.5)

The process of Example 3 was used to prepare another AFS treated zeolite, except that the AFS solution contained 2.6 g of AFS per 50.0 g of de-ionized water. This product was identified as UZM-4M (3.5). Comparisons of the x-ray diffraction patterns and chemical and physical properties are presented in Tables 3 and 4 respectively.

TABLE 3

X-ray diffraction comparison of UZM-4 vs. UZM-4M (3.5)

| UZM-4 (Ex. 2) | | | UZM-4M (3.5) | | |
|---|---|---|---|---|---|
| 2-θ | d(Å) | I/I % | 2-θ | d(Å) | I/I % |
| 6.70 | 13.18 | m | 6.64 | 13.30 | m |
| 7.68 | 11.50 | vs | 7.74 | 11.41 | vs |
| 13.36 | 6.62 | m | 13.40 | 6.60 | m |
| 14.90 | 5.94 | m | 15.00 | 5.90 | m-s |
| 15.44 | 5.73 | m | 15.46 | 5.73 | m |
| 18.90 | 4.69 | w-m | 19.00 | 4.67 | m |
| | | | 20.12 | 4.41 | m |
| 20.34 | 4.36 | m | 20.60 | 4.31 | m |
| 21.44 | 4.14 | m | 21.68 | 4.10 | s |
| 24.44 | 3.64 | m | 24.36 | 3.65 | m |
| | | | 24.62 | 3.61 | m-s |
| 26.80 | 3.32 | m | 27.04 | 3.29 | m |
| 27.62 | 3.23 | m | 27.88 | 3.20 | m |
| 28.78 | 3.10 | m | 28.18 | 3.16 | m |
| | | | 28.96 | 3.08 | m |
| 30.06 | 2.97 | m | 30.26 | 2.95 | s |
| 31.02 | 2.88 | m | 31.32 | 2.85 | m |
| 33.84 | 2.65 | m | 34.24 | 2.62 | m |
| 35.66 | 2.516 | w | 36.02 | 2.491 | w |
| 39.70 | 2.269 | w | 39.98 | 2.253 | w |
| | | | 41.08 | 2.195 | w |
| 41.26 | 2.186 | w | 41.66 | 2.166 | w |
| 43.64 | 2.072 | w-m | 44.18 | 2.048 | w |
| | | | 47.82 | 1.901 | w |
| 49.46 | 1.841 | w | 49.88 | 1.827 | w |
| 49.98 | 1.823 | w-m | 50.52 | 1.805 | w |
| | | | 52.60 | 1.739 | w |
| 53.88 | 1.700 | w | 54.34 | 1.687 | w |
| 55.70 | 1.649 | w-m | 56.42 | 1.630 | w |

TABLE 4

Chemical and Physical Characteristics of UZM-4 vs. UZM-4M (3.5)

| Properties | UZM-4 (Ex. 2) | UZM-4M (3.5) |
|---|---|---|
| C (wt. % anhydrous) | 0.39 | 0.44 |
| N (wt. % anhydrous) | 7.47 | 4.10 |
| $Na_2O$ (wt. % volatile free) | 0.50 | 0.47 |
| $Li_2O$ (wt. % volatile free) | 0.19 | 0.09 |
| $Al_2O_3$ (wt. % volatile free) | 32.31 | 19.27 |

TABLE 4-continued

Chemical and Physical Characteristics of UZM-4 vs. UZM-4M (3.5)

| Properties | UZM-4 (Ex. 2) | UZM-4M (3.5) |
|---|---|---|
| $SiO_2$ (wt. % volatile free) | 67.17 | 79.58 |
| F (wt. % anhydrous) | ND | 0.09 |
| Si/Al | 1.72 | 3.50 |
| $Na^+$/Al | 0.025 | 0.040 |
| $Li^+$/Al | 0.020 | 0.015 |
| N/Al | 0.913 | 0.812 |
| Cation Equivalent, $M^+$/Al | 0.958 | 0.867 |
| $M^+ = (Na^+ + Li + N)$ | | |
| Unit cell size (In Angstroms) | | |
| $a_0 =$ | 13.34 | 13.17 |
| $c_0 =$ | 13.26 | 13.23 |
| Framework Infrared | | |
| Asymmetric Stretch, $cm^{-1}$ | 1002 | 1040 |
| Surface Area | | |
| Micro pore Volume (cc/g) | 0.033 | 0.254 |
| Total pore Volume (cc/g) | 0.397 | 0.626 |
| BET surface area (sq. m/g) | 117 | 558 |
| $^{27}$Al NMR Mole % Al | | |
| Framework | 98.5 | 99.4 |
| Non-framework | 1.5 | 0.6 |

ND = Not determined

Example 5

Preparation of UZM-4M (5.2)

UZM-4 prepared as in Example 2 was treated as in Example 3 except that a solution of 3.9 g AFS in 74.4 g DI water was used. This sample was designated UZM-4M (5.2). Comparisons of x-ray diffraction patterns and chemical properties are presented in Tables 5 and 6 respectively.

TABLE 5

Comparison of x-ray diffraction patterns for UZM-4 and UZM-4M (5.2)

| UZM-4 (Ex. 2) | | | UZM-4M (5.2) | | |
|---|---|---|---|---|---|
| 2-θ | d(Å) | I/I % | 2-θ | d(Å) | I/I % |
| 6.66 | 13.26 | m | 6.60 | 13.38 | m |
| 7.66 | 11.53 | vs | 7.72 | 11.44 | vs |
| 13.40 | 6.60 | m | 13.36 | 6.62 | m |
| 14.88 | 5.95 | m | 14.98 | 5.91 | s |
| 15.42 | 5.74 | m | 15.42 | 5.74 | m |
| 18.90 | 4.69 | m | 18.98 | 4.67 | m |
| 20.20 | 4.39 | m | 20.58 | 4.31 | m |
| 21.40 | 4.15 | m | 21.66 | 4.10 | s |
| 24.22 | 3.67 | m | 24.64 | 3.61 | m |
| 26.76 | 3.33 | m | 27.08 | 3.29 | m |
| 27.60 | 3.23 | m | 27.92 | 3.19 | m |
| 28.72 | 3.11 | w | 29.02 | 3.07 | m |
| 30.08 | 2.97 | m | 30.34 | 2.94 | s |
| 31.00 | 2.88 | m | 31.40 | 2.85 | m |
| 33.82 | 2.65 | m | 34.28 | 2.61 | m |
| 35.62 | 2.52 | w | 36.08 | 2.49 | w |
| 41.26 | 2.19 | w | 41.76 | 2.16 | w |
| 43.68 | 2.07 | m | 44.24 | 2.05 | m |
| 49.48 | 1.84 | w | 49.98 | 1.82 | w |
| 50.08 | 1.82 | w | 50.60 | 1.80 | m |

TABLE 6

Comparison of Chemical and Physical Properties for UZM-4 and UZM-4M (5.2)

| Properties | UZM-4 (Ex. 2) | UZM-4M (5.2) |
|---|---|---|
| C (wt. % anhydrous) | 0.53 | 0.37 |
| N (wt. % anhydrous) | 7.51 | 3.29 |
| $Na_2O$ (wt. % volatile free) | 0.59 | 0.35 |
| $Li_2O$ (wt. % volatile free) | 0.09 | 0.00 |
| $Al_2O_3$ (wt. % volatile free) | 30.99 | 13.59 |
| $SiO_2$ (wt. % volatile free) | 63.32 | 82.57 |
| F (wt. % anhydrous) | ND | 0.10 |
| Si/Al | 1.74 | 5.31 |
| $Na^+$/Al | 0.031 | 0.042 |
| $Li^+$/Al | 0.009 | 0.000 |
| N/Al | 0.959 | 0.917 |
| Cation Equivalent, $M^+$/Al | 0.999 | 0.959 |
| $M^+ = (Na^+ + Li + N)$ | | |
| Unit cell size (In Angstroms) | | |
| $a_0 =$ | 13.34 | 13.15 |
| $c_0 =$ | 13.28 | 13.20 |
| Framework Infrared | | |
| Asymmetric Stretch, $cm^{-1}$ | 1002 | 1036 |
| Surface Area | | |
| Micro pore Volume (cc/g) | 0.028 | 0.220 |
| Total pore Volume (cc/g) | 0.331 | 0.665 |
| BET surface area ($m^2$/g) | 105 | 504 |
| $^{27}$Al NMR Mole % Al | | |
| Framework | 100.0 | 100.0 |
| Non-framework | | |

ND = Not determined

Example 6

Samples from Examples 2–5 were tested for cracking activity as follows. Each sample, 250 mg, was placed in an electrically heated reactor where it was pretreated for 30 minutes at 200° C. followed by 60 minutes at 550° C. in flowing hydrogen. During the test, the temperature of the reactor was ramped to 450° C., 500° C. and 550° C. and activity determined at each temperature. The feedstream used to test each sample consisted of hydrogen saturated with heptane at 0° C. and atmospheric pressure. The feed was introduced to the sample at a constant flowrate of 125 cc/min. The effluent gas stream was analyzed using a gas chromatograph. The total conversion of heptane and the conversion of heptane to the various categories of products, namely cracked products, isomerized products, aromatic products, and naphthenes are given in Table 7.

TABLE 7

Heptane Test Results for UZM-4 vs. UZM-4M

% Conversion at 450° C./500° C./550° C.

| Reaction | Example 2 | Example 3 | Example 4 | Example 5 |
|---|---|---|---|---|
| Cracking | 0.26/0.48/1.22 | 5.74/22.75/51.80 | 23.14/51.93/81.25 | 29.25/56.98/84.44 |
| Naphthenes | 0.38/0.39/0.37 | 0.09/0.00/0.07 | 0.00/0.11/0.27 | 0.02/0.00/0.23 |
| Isomerization | 0.14/.017/0.20 | 0.14/.016/0.14 | 0.13/0.12/0.47 | 0.15/0.45/0.54 |
| Aromatics | 0.00/0.00/0.04 | 0.09/0.27/0.91 | 0.18/0.69/2.44 | 0.17/0.55/2.13 |
| Total Conversion (C + N + I + A) | 0.78/1.04/1.83 | 6.06/23.18/52.92 | 23.45/52.85/84.43 | 29.59/57.98/87.84 |

These results show that the non-AFS treated zeolite (Ex. 2) has poor activity versus the AFS treated samples.

Examples 7–42

Post Treatment of the AFS Materials

The AFS-treated UZM-4 can be further modified to alter the properties of the materials such as porosity, hydrocarbon conversion activity, adsorption characteristics, and hydrothermal stability. These materials are also part of the UZM-4M family of materials. One type of modification employed was ion-exchange. Ammonium and sodium ion exchanges were carried out using the conditions in example 2. In cases where ammonium ion exchanges were carried out in the presence of acid, the procedure employed the same conditions except 0.2 g 70% HNO$_3$/g zeolite was added to the ammonium nitrate solution prior to the addition of the zeolite. Another type of modification is calcination. Calcinations were carried out in a dry air atmosphere for 1 hr at 550° C. A third type of modification is steaming. Steamings were carried out with 7% steam or 18% steam at 550° C. for 1 hr, or in the case of 95% steam at 600° C. for 1 hr. Table 8 below lists the parent material and the modifications that were performed on it. The order in which the modifications were performed is indicated by the number in the table, while the specific ions used in the exchange or steam levels employed are indicated in parenthesis.

TABLE 8

| Example | Parent Material | Calcination | Steaming | Ion-Exchange |
|---|---|---|---|---|
| 7 | Example 2 | | | 1 (Na$^+$) |
| 8 | Example 3 | | | 1 (Na$^+$) |
| 9 | | | 1 (95%) | |
| 10 | | 1 | | |
| 11 | | 1 | | 2 (NH$_4^+$) |
| 12 | | 1 | | 2 (NH$_4^+$/H$^+$) |
| 13 | | | 1 (7%) | |
| 14 | | | 1 (7%) | 2 (NH$_4^+$) |
| 15 | | | 1 (7%) | 2 (NH$_4^+$/H$^+$) |
| 16 | | | 1 (18%) | |
| 17 | | | 1 (18%) | 2 (NH$_4^+$) |
| 18 | | | 1 (18%) | 2 (NH$_4^+$/H$^+$) |
| 19 | Example 4 | | | 1 (Na$^+$) |
| 20 | | | 1 (95%) | |
| 21 | | 1 | | |
| 22 | | 1 | | 2 (NH$_4^+$) |
| 23 | | 1 | | 2 (NH$_4^+$/H$^+$) |
| 24 | | | 1 (7%) | |
| 25 | | | 1 (7%) | 2 (NH$_4^+$) |
| 26 | | | 1 (7%) | 2 (NH$_4^+$/H$^+$) |
| 27 | | | 1 (18%) | |
| 28 | | | 1 (18%) | 2 (NH$_4^+$) |
| 29 | | | 1 (18%) | 2 (NH$_4^+$/H$^+$) |
| 30 | Example 5* | | | |
| 31 | Example 5 | | 1 (95%) | |
| 32 | Example 5* | 1 | | |
| 33 | | 1 | | 2 (NH$_4^+$) |
| 34 | | 1 | | 2 (NH$_4^+$/H$^+$) |
| 35 | Example 5* | | 1 (7%) | |
| 36 | | | 1 (7%) | 2 (NH$_4^+$) |
| 37 | | | 1 (7%) | 2 (NH$_4^+$/H$^+$) |
| 38 | | | 1 (18%) | |
| 39 | | | 1 (18%) | 2 (NH$_4^+$) |
| 40 | | | 1 (18%) | 2 (NH$_4^+$/H$^+$) |
| 41 | Example 1 | | 1 (95%) | |
| 42 | Example 2 | | 1 (95%) | |

*UZM-4M(5.5) prepared by procedure of Example 5.

Example 43

Steaming of UZM-4 and UZM-4M Compositions

Hydrothermal stability is a desirable and often a necessary property for a catalyst under operating conditions. Steaming of various samples was carried out to determine if steaming improved the hydrothermal stability of any of the materials. Samples of the products from Examples 1 to 5 were steamed in a furnace at 600° C. with about 95% steam for 1 hour, left in the furnace overnight under a dry air purge, after which time they were hydrated at ambient conditions for 24 hours. The resulting steamed materials are represented in examples 41, 42, 9, 20, and 31, respectively. The FIGURE shows the x-ray diffraction patterns of these samples with each shown on the same intensity scale but offset for clarity. Comparison of x-ray diffraction powder patterns showed that samples from Examples 41 and 42, which are non AFS treated samples, (patterns a and b respectively in the FIGURE) suffered major structural damage while the AFS-treated samples from Examples 9, 20, and 31 (patterns c, d, and e respectively) showed good structural retention. Hence, the AFS treatment combined with steaming yielded hydrothermally stable materials.

Example 44

Hydrothermal versus thermal stability of various samples was determined by monitoring the crystallinity of the samples at various temperatures and hydration conditions via hot stage x-ray diffraction. For this study, the x-ray diffraction (xrd) patterns were obtained using a Siemens diffractometer equipped with a solid-state detector and a Pt strip heater for holding and heating the samples.

The xrd of the materials were obtained at room temperature in ambient air, then the materials were heated in flowing dry air and xrd patterns obtained at 100° C. steps up to 500° C. These data yield information about thermal stability. The samples were then cooled to room temperature and hydrated overnight in ambient air at room temperature after which their xrd patterns were again obtained. The materials were then re-heated to 100° and 500° C. and xrd patterns obtained at each temperature. Finally, the materials were cooled to room temperature and rehydrated overnight in ambient air after which xrd patterns were collected. These post-hydration data yield information about hydrothermal stability.

Table 9 details whether the samples were "stable" or "unstable" after the treatments described above. By "stable" is meant that at least 80% and preferably at least 90% of the crystallinity, i.e. structural integrity, was retained, while "unstable" means that less than 80% of the crystallinity was retained. The ammonium and sodium back-exchanged UZM-4 materials (Examples 2 and 7) are not thermally stable as they decompose in dry air. The AFS treated sodium back-exchanged Si/Al=2.7 and 3.5 (Examples 8 and 19) are hydrothermally stable, while the ammonium form of these same materials (Examples 3 and 4) are thermally stable, but not hydrothermally stable. This suggests that these two materials may require a steaming step such as that of Example 43 to be rendered hydrothermally stable. By contrast, AFS-treated Si/Al=5.2 and 5.5 materials (Examples 5 and 5*) are hydrothermally stable as is and do not require the steaming step.

TABLE 9

| Material | Heat to 500° C. | Ambient Hydration | Re-heat to 500° C. | Ambient Re-hydration |
|---|---|---|---|---|
| Example 1 | Stable | Stable | Stable | Stable |
| Example 2 | Unstable | | | |
| Example 3 | Stable | Unstable | | |
| Example 4 | Stable | Unstable | | |
| Example 5 | Stable | Stable | Stable | Stable |
| Example 5* | Stable | Stable | Stable | Stable |

TABLE 9-continued

| Material | Heat to 500° C. | Ambient Hydration | Re-heat to 500° C. | Ambient Re-hydration |
|---|---|---|---|---|
| Example 7 | Unstable | | | |
| Example 8 | Stable | Stable | Stable | Stable |
| Example 19 | Stable | Stable | Stable | Stable |
| Example 9 | Stable | Stable | Stable | Stable |
| Example 20 | Stable | Stable | Stable | Stable |
| Example 31 | Stable | Stable | Stable | Stable |

*UZM-4M(5.5) prepared by procedure of Example 5.

Example 45

McBain Adsorption Characterization

Adsorption capacities using a standard McBain-Bakr gravimetric adsorption apparatus were measured on the ammonium form of as-synthesized UZM-4, several AFS treated samples in the ammonium form, and several sodium back-exchanged AFS treated samples. All samples were pressed into pellets and loaded into the McBain apparatus without prior external calcination. All samples were initially vacuum activated overnight in the apparatus at 400° C. Equilibrium adsorption capacities for several gases—in the order of isobutane ($iC_4$), 2,2-dimethylbutane (2,2-DMB), oxygen ($O_2$), n-butane ($nC_4$), water ($H_2O$), and isobutane ($iC_4$) again—were then measured, with overnight reactivation at 350–375° C. following each gas. The data are shown in Table 10.

TABLE 10

Adsorption* of Various Molecules by UZM-4M After Various Treatments

| From Example#: Adsorbate | T(C) | P (mm) | P/P$_o$ | Ex.#2 Wt % | Ex.#3 wt % | Ex.#4 wt % | Ex.#5 wt % | Ex.#7 wt % | Ex.#8 wt % | Ex.#19 wt % |
|---|---|---|---|---|---|---|---|---|---|---|
| $iC_4$ | 23 | 100 | 0.04 | 0.94 | 11.80 | 11.25 | 9.50 | 2.56 | 8.99 | 8.62 |
| (Dia-5.0A) | 23 | 300 | 0.12 | 1.25 | 12.55 | 12.26 | 10.55 | 3.01 | 10.20 | 9.85 |
| | 23 | 750 | 0.30 | 1.44 | 13.27 | 12.75 | 11.35 | 3.14 | 10.83 | 10.44 |
| 2,2-DMB | 23 | 12 | 0.04 | 0.81 | 12.37 | 10.40 | 7.86 | 2.65 | 10.50 | 9.55 |
| (Dia = 6.2A) | 23 | 38 | 0.12 | 1.38 | 13.49 | 11.10 | 8.95 | 3.50 | 11.39 | 10.54 |
| | 23 | 95 | 0.30 | 1.88 | 14.29 | 12.11 | 9.71 | 3.95 | 12.60 | 11.18 |
| $O_2$ | −183 | 100 | 0.13 | 7.78 | 28.18 | 28.90 | 27.10 | 9.17 | 26.32 | 25.87 |
| (Dia = 3.64A) | −183 | 300 | 0.39 | 8.94 | 30.57 | 31.34 | 29.64 | 10.07 | 28.23 | 28.05 |
| | −183 | 700 | 0.92 | 11.16 | 33.94 | 34.78 | 33.33 | 11.69 | 31.23 | 30.82 |
| $nC_4$ (Dia = 4.3A) | 23 | 520 | 0.30 | 2.00 | 13.16 | 13.27 | 12.25 | 3.60 | 13.51 | 12.89 |
| $H_2O$ (Dia = 2.65A) (equil. 23 hr. @ RT) | 23 | 4.6 | 0.21 | 13.52 | 24.90 | 25.35 | 22.75 | 16.05 | 25.14 | 23.58 |
| $iC_4$ (after $H_2O$) | 23 | 750 | 0.30 | 0.75 | 0.59 | 3.20 | 10.19 | 1.67 | 9.41 | 9.23 |

*adsorption presented as wt. % ((g adsorbate/100 g adsorbent) × 100%)

The substantial adsorption of all adsorbates including the large 2,2-DMB by all the initially activated samples, except the $NH_4$ or Na exchanged starting material demonstrates the improved thermal activation stability resulting from the AFS treatment. The substantially retained i-$C_4$ capacity after the $H_2O$ adsorption for the examples 5, 8, and 19 products shows that these modifications additionally exhibit greatly improved stability to rehydration after activation.

Table 11 below shows the most comparable result for each adsorbate expressed as the estimated liquid volume adsorbed (wt. % adsorbed divided by the liquid density of the adsorbate). On each treated sample the uptake of similar volumes of each adsorbate, regardless of molecule size, demonstrates the openness of the large micropores.

TABLE 11

Volume* of Adsorbate Adsorbed by UZM-4M After Various Treatments

| | | | | | | Example# | | | | | | |
|---|---|---|---|---|---|---|---|---|---|---|---|---|
| | Liquid Den. | T | P | | Ads. Dia. | 2 $NH_4$ Syn | 3 AFS | 4 AFS | 5 AFS | 7 Na Exch | 8 Na Exch | 19 Na Exch |
| Adsorbate | (g/cc) | (° C.) | (mm) | P/$P_o$ | (Å) | 1.75 | 2.7 | 3.5 | 5.2 | 1.75 | 2.7 | 3.5 |
| $H_2O$ | 1.00 | 23 | 4.6 | 0.21 | 2.65 | 13.5 | 24.9 | 25.4 | 22.8 | 16.1 | 25.1 | 23.6 |
| $O_2$ | 1.14 | −183 | 100 | 0.13 | 3.46 | 6.8 | 24.7 | 25.4 | 23.8 | 8.0 | 23.1 | 22.7 |
| n-$C_4$ | 0.58 | 23 | 520 | 0.30 | 4.30 | 3.5 | 22.7 | 22.9 | 21.2 | 6.2 | 23.3 | 22.3 |
| I-$C_4$ | 0.56 | 23 | 750 | 0.30 | 5.00 | 2.6 | 23.8 | 22.9 | 20.4 | 5.6 | 19.4 | 18.7 |
| 2,2-DMB | 0.65 | 23 | 95 | 0.30 | 6.20 | 2.9 | 22.0 | 18.7 | 15.0 | 6.1 | 19.4 | 17.2 |
| I-$C_4$ after $H_2O$ | 0.56 | 23 | 750 | 0.30 | 5.00 | 1.4 | 1.1 | 5.8 | 18.3 | 3.0 | 16.9 | 16.6 |

*cc adsorbate/100 g adsorbent

Example 46

Further treatment of the AFS-treated UZM-4 species broadens the family of UZM-4M materials which possess a wide range of properties, as demonstrated below. Among the properties that can be adjusted are the micropore volume, surface area and Si/Al ratio, the latter which affects the exchange capacity and acidity of the material. As indicated in Table 8 and Example 43 describing the preparation of Examples 7–42, the AFS-treated materials from Examples 3, 4, and 5 were initially treated by one of four methods: 1 hr calcination at 550° C. in dry air, 1 hr steam at 7% or 18% steam at 550° C. or 95% steam at 600° C. Many of these materials were further treated via $NH_4^+$ or $NH_4^+/H^+$ ion-exchange, again according to the above section describing the preparation of samples 7–42. Heptane results were acquired by the methods of Example 6. The properties of selected materials are shown below in Table 12.

It is easily seen from the heptane conversion data that mild steam (<50% steam) treatments are preferred over calcination for the preparation of UZM-4M materials with good low temperature catalytic activity. It is also seen that calcination and mild steam (<50% steam) post AFS treatments are preferred over harsh steam treatment (<50% steam) for stabilizing high surface areas and micropore volumes in the UZM-4M materials. Furthermore, it is seen that a post-treatment consisting of an ammonium ion exchange or an acidic ammonium ion exchange can raise the Si/Al ratio over that obtained with just a calcination or a steaming step. Therefore, by careful selection of treatments and treatment sequence, one can custom tailor the properties of UZM-4M.

We claim as our invention:

1. A microporous crystalline zeolite (UZM-4M) having a three dimensional framework of at least $AlO_2$ and $SiO_2$ tetrahedral units and a composition on an anhydrous basis expressed by an empirical formula of:

$$M1_a^{n+}Al_{1-x}E_xSi_yO_z$$

TABLE 12

Physical Properties of Various UZM-4M Compositions

| Example | UZM-4M (Si/Al) | % steam or calcine | Ion Exchange | Si/Al | $N_2$ micropore Volume (cc) | BET SA ($m^2/g$) | Heptane Conversion 450° | 550° C. |
|---|---|---|---|---|---|---|---|---|
| 10 | 2.7 | calcine | — | 2.7 | 0.15 | 324 | 6 | 37 |
| 11 | | | $NH_4$ | 3.0 | 0.23 | 479 | 44 | 87 |
| 12 | | | $NH_4/H^+$ | 3.5 | 0.21 | 449 | 28 | 79 |
| 16 | | 18 | — | 2.7 | 0.22 | 476 | 36 | 83 |
| 17 | | | $NH_4$ | 2.8 | 0.20 | 431 | 60 | 90 |
| 18 | | | $NH_4/H^+$ | 3.5 | 0.20 | 438 | 56 | 87 |
| 9 | | 95 | — | 2.7 | 0.16 | 386 | | |
| 21 | 3.5 | calcine | — | 3.6 | 0.26 | 543 | 62 | 91 |
| 22 | | | $NH_4$ | 4.1 | 0.26 | 557 | 77 | 85 |
| 23 | | | $NH_4/H^+$ | 5.1 | 0.26 | 542 | 66 | 87 |
| 27 | | 18 | — | 3.6 | 0.25 | 531 | 63 | 90 |
| 28 | | | $NH_4$ | 4.4 | 0.21 | 456 | 77 | 88 |
| 29 | | | $NH_4/H^+$ | 5.0 | 0.27 | 581 | 77 | 86 |
| 20 | | 95 | — | 3.5 | 0.18 | 421 | | |
| 32 | 5.5 | calcine | — | 5.5 | 0.22 | 497 | 29 | 87 |
| 33 | | | $NH_4$ | 6.9 | 0.21 | 497 | 49 | 89 |
| 34 | | | $NH_4/H^+$ | 10.0 | 0.16 | 395 | 12 | 63 |
| 38 | | 18 | — | 5.5 | 0.20 | 473 | 65 | 86 |
| 39 | | | $NH_4$ | 6.2 | 0.20 | 481 | 80 | 78 |
| 40 | | | $NH_4/H^+$ | 9.0 | 0.21 | 499 | 63 | 88 |
| 31 | | 95 | — | 5.2 | 0.18 | 429 | | | where M1 is at least one exchangeable cation selected from the group consisting of alkali metals, alkaline earth metals, rare earth metals, hydrogen ion, ammonium ion and mixtures thereof, "a" is the mole ratio of M1 to (Al+E) and varies from about 0.15 to about 1.5, "n" is the weighted average valence of M1 and has a value of about 1 to about 3, E is an element selected from the group consisting of gallium, iron, boron, chromium, indium and mixtures thereof, "x" is the mole fraction of E and has a value from 0 to about 0.5, "y" is the mole ratio of Si to (Al+E) and varies from about 1.75 to about 500 and "z" is the mole ratio of 0 to (Al+E) and has a value determined by the equation:

$$z=(a \cdot n+3+(4 \cdot y))/2$$

and is characterized in that it has the x-ray diffraction pattern having at least the d spacings and intensities set forth in Table A:

TABLE A

| 2θ | d(Å) | I/I₀ % |
|---|---|---|
| 6.55–6.83 | 13.49–12.93 | m |
| 7.63–7.91 | 11.58–11.17 | vs |
| 13.27–13.65 | 6.67–6.48 | m–s |
| 14.87–15.25 | 5.95–5.81 | m–vs |
| 15.35–15.74 | 5.77–5.63 | m |
| 18.89–19.31 | 4.69–4.59 | m |
| 20.17–20.50 | 4.40–4.33 | w–m |
| 20.43–20.85 | 4.34–4.26 | m |
| 21.51–21.97 | 4.13–4.04 | m–vs |
| 24.14–24.67 | 3.68–3.60 | m–s |
| 24.47–24.98 | 3.63–3.56 | m–s |
| 27.73–28.27 | 3.21–3.15 | w–m |
| 30.11–30.73 | 2.97–2.90 | m–s |
| 31.13–31.75 | 2.87–2.81 | w–m. |

2. The zeolite of claim 1 where said zeolite is thermally stable to a temperature of at least 400° C.

3. The zeolite of claim 1 where M1 is selected from the group consisting of lithium, sodium, cesium, strontium, barium, hydrogen ion, ammonium ion and mixtures thereof.

4. The zeolite of claim 1 where M1 is a mixture of an alkali metal and an alkaline earth metal.

5. The zeolite of claim 1 where M1 is a mixture of a rare earth metal and hydrogen ion.

6. A process for preparing a modified microporous crystalline zeolite (UZM-4M) having a three dimensional framework of at least AlO₂ and SiO₂ tetrahedral units and a composition on an anhydrous basis expressed by an empirical formula of:

$$M1_a^{n+}Al_{1-x}E_xSi_yO_z$$

where M1 is at least one exchangeable cation selected from the group consisting of alkali metals, alkaline earth metals, rare earth metals, hydronium ion, ammonium ion and mixtures thereof, "a" is the mole ratio of M1 to (Al+E) and varies from about 0.15 to about 1.5, "n" is the weighted average valence of M and has a value of about 1 to about 3, E is an element selected from the group consisting of gallium, iron, boron, chromium, indium and mixtures thereof, "x" is the mole fraction of E and has a value from 0 to about 0.5, "y" is the mole ratio of Si to (Al+E) and varies from about 1.75 to about 25.0; and "z" is the mole ratio of O to (Al+E) and has a value determined by the equation:

$$z=(a \cdot n+3+(4 \cdot y))/2$$

and is characterized in that it has the x-ray diffraction pattern having at least the d-spacings and intensities set forth in Table A:

TABLE A

| 2θ | d(Å) | I/I₀ % |
|---|---|---|
| 6.55–6.83 | 13.49–12.93 | m |
| 7.63–7.91 | 11.58–11.17 | vs |
| 13.27–13.65 | 6.67–6.48 | m–s |
| 14.87–15.25 | 5.95–5.81 | m–vs |
| 15.35–15.74 | 5.77–5.63 | m |
| 18.89–19.31 | 4.69–4.59 | m |
| 20.17–20.50 | 4.40–4.33 | w–m |
| 20.43–20.85 | 4.34–4.26 | m |
| 21.51–21.97 | 4.13–4.04 | m–vs |
| 24.14–24.67 | 3.68–3.60 | m–s |
| 24.47–24.98 | 3.63–3.56 | m–s |
| 27.73–28.27 | 3.21–3.15 | w–m |
| 30.11–30.73 | 2.97–2.90 | m–s |
| 31.13–31.75 | 2.87–2.81 | w–m. | the process comprising treating a starting microporous crystalline zeolite with a fluorosilicate solution or slurry at a pH of about 3 to about 7 to give the modified zeolite; the starting zeolite having an empirical formula on an anhydrous basis of:

$$M'^{n+}_{m'}R^{p+}_rAl_{1-x}E_xSi_yO_z \quad \text{(III)}$$

where "m'" is the mole ratio of M to (Al+E) and varies from 0 to about 1.5, M' is at least one exchangeable cation selected from the group consisting of alkali metals, alkaline earth metals, rare earth metals, hydrogen ion and ammonium ion, R is at least one organic cation selected from the group consisting of protonated amines, quaternary ammonium ions, diquaternary ammonium ions, protonated alkanolamines and quaternized alkanolammonium ions, "r" is the mole ratio of R to (Al+E) and has a value from 0 to about 1.5 and "p" is the weighted average valence of R and has a value of about 1 to about 2, E is an element selected from the group consisting of gallium, iron, boron, chromium, indium and mixtures thereof, "x" is the mole fraction of E and has a value from 0 to about 0.5, "y" is the mole ratio of Si to (Al+E) and varies from about 1.5 to about 10.0 and "z" is the mole ratio of 0 to (Al+E) and has a value determined by the equation:

$$z=(m \cdot n+r \cdot p+3+4 \cdot y)/2.$$

7. The process of claim 6 where the modified zeolite is further treated by steaming at steaming conditions which include a temperature of about 400° C. to about 850° C., a time of about 10 minutes to about 4 hours and a steam concentration of about 1% to about 100% to provide a steamed modified zeolite.

8. The process of claim 7 where the steam concentration varies from about 5% to about 50%.

9. The process of claim 7 where the steamed modified zeolite is further treated by calcining at a temperature of about 400° C. to about 600° C. for a time of about 0.5 hours to about 24 hours to give a calcined steamed modified zeolite.

10. The process of claim 7 where the steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof.

11. The process of claim 10 where the ion exchange conditions comprise a temperature of about 15° C. to about 100° C. and a time of about 20 minutes to about 50 hours.

12. The process of claim 10 where the solution comprises a cation selected from the group consisting of ammonium ion, hydrogen ion and mixtures thereof.

13. The process of claim 9 where the calcined steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof.

14. The process of claim 13 where the ion exchange conditions comprise a temperature of about 15° C. to about 100° C. and a time of about 20 minutes to about 50 hours.

15. The process of claim 13 where the solution comprises a cation selected from the group consisting of ammonium ion, hydrogen ion and mixtures thereof.

16. The process of claim 6 where the modified zeolite is further treated by calcining at a temperature of about 400° C. to about 600° C. for a time of about 0.5 to about 24 hours to give a calcined modified zeolite.

17. The process of claim 16 where the calcined modified zeolite is steamed at a temperature of about 400° C. to about 850° C., a time of about 10 minutes to about 4 hours and a steam concentration of about 1% to about 100% to give a steamed calcined modified zeolite.

18. The process of claim 17 where the steam concentration varies from about 5% to about 50%.

19. The process of claim 16 where the calcined modified zeolite is further treated by ion exchanging at ion exchange conditions with a solution comprising a cation selected from the group consisting of alkali metals, alkaline earth metals, rare earth metals, hydrogen ion, ammonium ion and mixtures thereof.

20. The process of claim 19 where the ion exchange conditions comprise a temperature of about 15° C. to about 100° C. and a time of about 20 minutes to about 50 hours.

21. The process of claim 19 where the solution comprises a cation selected from the group consisting of ammonium ion, hydrogen ion and mixtures thereof.

22. The process of claim 17 where the steamed calcined modified zeolite is further treated by ion exchanging at ion exchange conditions with a solution comprising a cation selected from the group consisting of alkali metals, alkaline earth metals, rare earth metals, hydrogen ion, ammonium ion and mixtures thereof.

23. The process of claim 22 where the ion exchange conditions comprise a temperature of about 15° C. to about 100° C. and a time of about 20 minutes to about 50 hours.

24. The process of claim 22 where the solution comprises a cation selected from the group consisting of ammonium ion, hydrogen ion and mixtures thereof.

25. The process of claim 6 where the modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite.

26. The process of claim 25 where the ion exchange conditions comprise a temperature of about 15° C. to about 100° C. and a time of about 20 minutes to about 50 hours.

27. The process of claim 25 where the solution comprises a cation selected from the group consisting of ammonium ion, hydrogen ion and mixtures thereof.

28. The process of claim 25 where the ion exchanged modified zeolite is further treated by steaming at steaming conditions which include a temperature of about 400° C. to about 850° C., a time of about 10 minutes to about 4 hrs. and a steam concentration of about 1% to about 100% to provide a steamed ion exchanged modified zeolite.

29. The process of claim 28 where the steamed ion exchange modified zeolite is further treated by calcining at a temperature of about 400° C. to about 600° C. for a time of about 0.5 hrs. to about 24 hrs. to give a calcined steamed ion exchanged modified zeolite.

30. The process of claim 25 where the ion exchanged modified zeolite is calcined at a temperature of about 400° C. to about 600° C. for a time of about 0.5 hrs. to about 24 hr. to give a calcined ion exchanged modified zeolite.

31. The process of claim 30 where the calcined ion exchanged modified zeolite is steamed at steaming conditions which include a temperature of about 400° C. to about 850° C., a time of about 10 minutes to about 4 hours and a steam concentration of about 1% to about 100% to provide a steamed calcined ion exchanged modified zeolite.

32. The process of claim 28 where the steamed ion exchanged modified zeolite is further treated by contacting it with a solution at ion exchange conditions, the solution comprising at least one cation selected from the group consisting of alkali metals, alkaline earth metals, rare earth metals, hydrogen ion, ammonium ion and mixtures thereof.

33. The process of claim 32 where the ion exchange conditions comprise a temperature of about 15° C. to about 100° C. and a time of about 20 minutes to about 50 hours.

34. The process of claim 29 where the calcined steamed ion exchanged modified zeolite is further treated by contacting it with a solution at ion exchange conditions, the solution comprising at least one cation selected from the group consisting of alkali metals, alkaline earth metals, rare earth metals, hydrogen ion, ammonium ion and mixtures thereof.

35. The process of claim 34 where the ion exchange conditions comprise a temperature of about 15° C. to about 100° C. and a time of about 20 minutes to about 50 hours.

36. The process of claim 30 where the calcined ion exchange modified zeolite is further treated by contacting it with a solution at ion exchange conditions, the solution comprising at least one cation selected from the group consisting of alkali metals, alkaline earth metals, rare earth metals, hydrogen ion, ammonium ion and mixtures thereof.

37. The process of claim 36 where the ion exchange conditions comprise a temperature of about 15° C. to about 100° C. and a time of about 20 minutes to about 50 hours.

38. The process of claim 31 where the steamed calcined ion exchanged modified zeolite is further treated by contacting it with a solution at ion exchange conditions, the solution comprising at least one cation selected from the group consisting of alkali metals, alkaline earth metals, rare earth metals, hydrogen ion, ammonium ion and mixtures thereof.

39. The process of claim 38 where the ion exchange conditions comprise a temperature of about 15° C. to about 100° C. and a time of about 20 minutes to about 50 hours.

40. A hydrocarbon conversion process comprising contacting a hydrocarbon with a catalytic composite at hydrocarbon conversion conditions to give a converted product, the catalytic composite comprising a microporous crystalline zeolite having a three dimensional framework of at least $AlO_2$ and $SiO_2$ tetrahedral units and an empirical composition on an anhydrous basis expressed by an empirical formula of:

$$M1_a^{n+}Al_{1-x}E_xSi_yO_z$$

where M1 is at least one exchangeable cation selected from the group consisting of alkali metals, alkaline earth metals, rare earth metals, hydronium ion, ammonium ion and mixtures thereof, "a" is the mole ratio of M1 to (Al+E) and varies from about 0.15 to about 1.5, "n" is the weighted average valence of M1 and has a value of about 1 to about 3, E is an element selected from the group consisting of gallium, iron, boron, chromium, indium and mixtures thereof, "x" is the mole fraction of E and has a value from 0 to about 0.5, "y" is the mole ratio of Si to (Al+E) and varies from about 1.75 to about 25.0 and "z" is the mole ratio of 0 to (Al+E) and has a value determined by the equation:

$$z=(a\cdot n+3+(4\cdot y))/2$$

and is characterized in that it has the x-ray diffraction pattern having at least the d-spacings and intensities set forth in Table A:

TABLE A

| 2θ | d(Å) | I/I₀ % |
|---|---|---|
| 6.55–6.83 | 13.49–12.93 | m |
| 7.63–7.91 | 11.58–11.17 | vs |
| 13.27–13.65 | 6.67–6.48 | m–s |
| 14.87–15.25 | 5.95–5.81 | m–vs |
| 15.35–15.74 | 5.77–5.63 | m |
| 18.89–19.31 | 4.69–4.59 | m |
| 20.17–20.50 | 4.40–4.33 | w–m |
| 20.43–20.85 | 4.34–4.26 | m |
| 21.51–21.97 | 4.13–4.04 | m–vs |
| 24.14–24.67 | 3.68–3.60 | m–s |
| 24.47–24.98 | 3.63–3.56 | m–s |
| 27.73–28.27 | 3.21–3.15 | w–m |
| 30.11–30.73 | 2.97–2.90 | m–s |
| 31.13–31.75 | 2.87–2.81 | w–m. |

41. The process of claim 40 where the hydrocarbon conversion process is selected form the group consisting of hydrocracking, hydro-isomerization of paraffins, xylene isomerization, transalkylation of aromatics, disproportionation of aromatics, alkylation of aromatics and isomerization of paraffins.

42. A process for separating a mixture of molecular species comprising contacting the mixture with a microporous crystalline zeolite (UZM-4M) thereby separating at least one species from the mixture, the microporous crystalline zeolite having a three dimensional framework of at least AlO₂ and SiO₂ tetrahedral units and a composition on an anhydrous basis expressed by an empirical formula of:

where M1 is an exchangeable cation selected from the group consisting of alkali metals, alkaline earth metals, rare earth metals, hydrogen ion, ammonium ion and mixtures thereof, "a" is the mole ratio of M1 to (Al+E) and varies from about 0.15 to about 1.5, "n" is the weighted average valence of M1 and has a value of about 1 to about 3, E is an element selected from the group consisting of gallium, iron, boron, chromium, indium and mixtures thereof, "x" is the mole fraction of E and has a value from 0 to about 0.5, "y" is the mole ratio of Si to (Al+E) and varies from about 1.75 to about 500 and "z" is the mole ratio of O (Al+E) and has a value determined by the equation:

$$z=(a\cdot n+3+(4\cdot y))/2;$$

the zeolite characterized in that it has an x-ray diffraction pattern having at least the d spacings and intensities set forth in Table A:

| 2θ | D(Å) | I/I₀ % |
|---|---|---|
| 6.55–6.83 | 13.49–12.93 | m |
| 7.63–7.91 | 11.58–11.17 | vs |
| 13.27–13.65 | 6.67–6.48 | m–s |
| 14.87–15.25 | 5.95–5.81 | m–vs |
| 15.35–15.74 | 5.77–5.63 | m |
| 18.89–19.31 | 4.69–4.59 | m |
| 20.17–20.50 | 4.40–4.33 | w–m |
| 20.43–20.85 | 4.34–4.26 | m |
| 21.51–21.97 | 4.13–4.04 | m–vs |
| 24.14–24.67 | 3.68–3.60 | m–s |
| 24.47–24.98 | 3.63–3.56 | m–s |
| 27.73–28.27 | 3.21–3.15 | w–m |
| 30.11–30.73 | 2.97–2.90 | m–s |
| 31.13–31.75 | 2.87–2.81 | w–m. |

\* \* \* \* \*